US012794500B2

(12) United States Patent
Kwon et al.

(10) Patent No.: US 12,794,500 B2
(45) Date of Patent: Nov. 10, 2026

(54) ANTENNA SYSTEM OF VEHICLE FOR RECEIVING BROADCAST SIGNAL, AND OPERATION METHOD THEREOF

(71) Applicants: Hyundai Motor Company, Seoul (KR); Kia Corporation, Seoul (KR)

(72) Inventors: Oh Yun Kwon, Hwaseong (KR); Jae Kyu Yu, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 234 days.

(21) Appl. No.: 18/760,684

(22) Filed: Jul. 1, 2024

(65) Prior Publication Data

US 2025/0211271 A1 Jun. 26, 2025

(30) Foreign Application Priority Data

Dec. 20, 2023 (KR) ........................ 10-2023-0186951

(51) Int. Cl.
*H04B 1/12* (2006.01)
*H01Q 1/32* (2006.01)
*H04B 1/04* (2006.01)

(52) U.S. Cl.
CPC ................. *H04B 1/12* (2013.01); *H04B 1/04* (2013.01); *H01Q 1/32* (2013.01); *H04B 2001/0416* (2013.01)

(58) Field of Classification Search
None
See application file for complete search history.

(56) References Cited

U.S. PATENT DOCUMENTS 5,339,454 A * 8/1994 Kuo ..................... H03G 3/3068 455/247.1
8,041,322 B2 * 10/2011 Akahori ............... H03G 3/3068 455/245.2
8,428,535 B1 * 4/2013 Cousinard ................ A42B 3/24 455/245.2
8,537,284 B2 * 9/2013 Ma ........................... H04N 5/21 348/730
9,656,552 B2 * 5/2017 Kautz .................... H04B 15/00
(Continued)

FOREIGN PATENT DOCUMENTS

CN 108303587 A * 7/2018 ........... G01R 23/165
EP 1056221 A2 * 11/2000 ........... H04B 7/0805
(Continued)

OTHER PUBLICATIONS

CN108303587A English translation (Year: 2026).*
JPS57115033A English translation (Year: 2026).*

*Primary Examiner* — Gennadiy Tsvey
(74) *Attorney, Agent, or Firm* — Fox Rothschild LLP

(57) ABSTRACT

An antenna system of a vehicle includes a first low noise amplifier (LNA) for adjusting a strength of a radio frequency (RF) signal received by an antenna element; a mixer for converting the adjusted RF signal received through a connection cable into an intermediate frequency (IF) signal; a second low noise amplifier for adjusting a strength of the IF signal; a noise level detector for measuring a noise level introduced into the connection cable; and a second auto gain controller (AGC) for controlling a gain of the second LNA based on the strength of the IF signal and the noise level.

12 Claims, 5 Drawing Sheets

(56) References Cited

U.S. PATENT DOCUMENTS

2004/0266344 A1* 12/2004 Zafar ........................ H01Q 5/40 455/13.3
2004/0266379 A1* 12/2004 Woo ..................... H04B 1/0057 455/150.1
2005/0047534 A1* 3/2005 Lindoff ............... H04L 27/3809 375/345
2006/0174299 A1* 8/2006 Watanabe ................ H04B 1/18 725/100
2006/0293012 A1* 12/2006 Jo ............................ H03D 7/18 370/312
2007/0052867 A1* 3/2007 Ohiwa ................. H03G 3/3068 348/731
2008/0152051 A1* 6/2008 Mada ................... H03G 3/3078 375/345
2009/0004987 A1* 1/2009 Akahori ................... H04B 1/18 455/251.1
2009/0322963 A1* 12/2009 Furuya ............... H04N 21/4382 348/E5.113
2010/0159863 A1* 6/2010 Moon .................. H03G 3/3052 455/234.1
2012/0249209 A1* 10/2012 Akeboshi ................ H04L 27/08 327/308
2012/0252389 A1* 10/2012 Krishnan ............. H03G 3/3068 455/200.1
2014/0357211 A1* 12/2014 May ........................ H03G 3/008 455/249.1
2014/0357311 A1* 12/2014 Suzuki ................. H04B 1/3822 455/522
2014/0370832 A1* 12/2014 May ........................ H03D 7/166 455/313
2015/0117571 A1* 4/2015 Matsui ................. H03G 3/3068 375/340
2015/0124892 A1* 5/2015 Sugimoto ............. H04L 25/028 375/257
2015/0270603 A1* 9/2015 Lee .......................... H04B 1/18 343/713
2018/0166771 A1* 6/2018 Deng ................... H04B 1/0064

FOREIGN PATENT DOCUMENTS

| | | | | | |
|---|---|---|---|---|---|
| EP | 2670051 | A2 | * | 12/2013 | ............... H03G 3/00 |
| JP | S57115033 | A | * | 7/1982 | ............... H04B 3/11 |
| JP | 2500288 | Y2 | * | 6/1996 | |
| JP | 2005102008 | A | * | 4/2005 | |
| JP | 2006050484 | A | * | 2/2006 | |
| JP | 2006129161 | A | * | 5/2006 | |
| JP | 2010004286 | A | * | 1/2010 | |
| JP | 2011211539 | A | * | 10/2011 | |
| KR | 20110083424 | A | * | 7/2011 | ............. H01Q 5/314 |
| KR | 20140129795 | A | * | 11/2014 | ............... H04B 1/04 |
| TW | I699093 | B | * | 7/2020 | |
| WO | WO-0182479 | A2 | * | 11/2001 | ......... H03H 9/02409 |

* cited by examiner

ANTENNA SYSTEM OF VEHICLE FOR RECEIVING BROADCAST SIGNAL, AND OPERATION METHOD THEREOF

CROSS REFERENCE TO RELATED APPLICATION

This application claims under 35 U.S.C. § 119 (a) the benefit of Korean Patent Application Number 10-2023-0186951, filed on Dec. 20, 2023 in the Korean Intellectual Property Office, the entire contents of which are incorporated herein by reference.

BACKGROUND

(a) Technical Field

The present disclosure relates to an antenna system of a vehicle for receiving a broadcast signal, and an operation method thereof.

(b) Description of the Related Art

Typically, electrical devices that process signals implement automatic gain control (AGC) in order to reduce cross-modulation occurring in an amplifier and prevent saturation. Particularly, in a receiver of a communication system, automatic gain control is used for the purpose of obtaining a signal of a desired level when the signal level at the input is not constant. That is, AGC serves to prevent signal saturation by lowering the gain value if the input signal level is greater than a reference value, and to output a signal of a constant level by increasing the gain value if the input signal level is less than the reference value.

AGC can be applied in vehicle antenna systems. A vehicle antenna system includes an antenna module which primarily adjusts the strength of a radio frequency (RF) signal received from the outside and a radio tuner which secondarily adjusts the strength of an intermediate frequency (IF) signal into which the RF signal is converted. An automatic gain controller may adjust the gain of the antenna module and the gain of the radio tuner.

The antenna module and the radio tuner adjust the strength of the RF signal or IF signal to minimize noise in each signal, in order for a passenger in the vehicle to clearly hear a radio broadcast over a target channel they want to listen to.

However, due to noise coming from the outside into the antenna system and the relationship between channels in the signal, it may be difficult for the vehicle antenna system to reduce distortion and noise in the target channel.

SUMMARY

According to at least one embodiment, the present disclosure provides an antenna system of a vehicle. The antenna system comprises a first low noise amplifier for adjusting the strength of a radio frequency (RF) signal received by an antenna element; a mixer for converting the adjusted RF signal received through a connection cable into an intermediate frequency (IF) signal; a second low noise amplifier (LNA) for adjusting the strength of the IF signal; a noise level detector for measuring a noise level introduced into the connection cable; and a second auto gain controller (AGC) for controlling a gain of the second LNA based on the strength of the IF signal and the noise level.

A vehicle may include the above-described antenna system.

According to another embodiment of the present disclosure provides an operation method of a vehicle antenna system. The method comprises measuring a noise level introduced into a connection cable between a first low noise amplifier (LNA) for adjusting a strength of an RF signal received by an antenna element and a second LNA for adjusting a strength of an IF signal into which the adjusted RF signal is converted; and controlling a gain of the second LNA based on the strength of the IF signal and the noise level.

According to a further embodiment of the present disclosure, an operation method of a vehicle antenna system includes: adjusting, by a first low noise amplifier (LNA), a strength of a radio frequency (RF) signal received by an antenna element; converting, by a mixer, the adjusted RF signal received through a connection cable into an intermediate frequency (IF) signal; adjusting, by a second low noise amplifier, a strength of the IF signal; measuring, by a noise level detector, a noise level introduced into the connection cable; and controlling, by a second auto gain controller (AGC), a gain of the second LNA based on the strength of the IF signal and the noise level.

DETAILED DESCRIPTION

Figure 1:
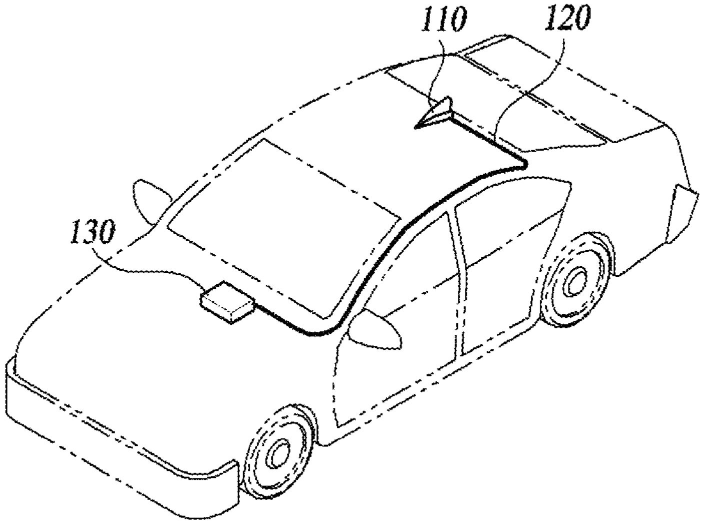
FIG. 1 is a configuration diagram of a vehicle antenna system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word “comprise” and variations such as “comprises” or “comprising” will be understood to imply the inclusion of stated elements but not the exclusion of any other elements. In addition, the terms “unit”, “-er”, “-or”, and “module” described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure are directed to providing a vehicle antenna system for preventing degradation of a noise factor caused by noise introduced into a connection cable between an antenna module and a radio tuner, and an operation method thereof.

Other embodiments of the present disclosure are directed to providing a vehicle antenna system for preventing degradation of a noise factor that is caused by the signal strength of a channel neighboring a target channel, and an operation method thereof.

The problems to be solved by the present disclosure are not limited to the above-mentioned ones, and other problems not mentioned herein may be clearly understood by those skilled in the art from the description below.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part “includes” or is “equipped with” an element, this means that the part may further include other elements, not excluding other elements unless explicitly stated to the contrary. Further, when an element in the written description and claims is described as being “for” performing or carry out a stated function, step, set of instructions, or the like, the element may also be considered as being “configured to” do so.

Each component of a device or method according to the present disclosure may be implemented in hardware or software, or in a combination of hardware and software. In addition, the functions of each component may be implemented in software. A microprocessor or processor may execute functions of the software corresponding to each component.

FIG. 1 is a configuration diagram of a vehicle antenna system according to an embodiment of the present disclosure.

Referring to FIG. 1, the vehicle antenna system may include an antenna module 110, a connection cable 120, and a radio tuner 130.

The antenna module 110 may receive a radio frequency (RF) signal from the outside or send the RF signal. The antenna module 110 may be provided on the vehicle’s roof, rear windshield, etc.

The radio tuner 130 may analyze a signal received by the antenna module 110, decode audio information, or process GPS information. The radio tuner 130 may be provided at the top of the dashboard, the top or middle of the center fascia, the rear of the gearbox, the rear of the backrest of the driver’s seat or the passenger’s seat, or the rear of the headrest.

To minimize noise in the received signal so that a passenger in the vehicle clearly hears a radio broadcast over a target channel they want to listen to, the antenna module 110 and the radio tuner 130 each include a low noise amplifier (LNA) and an auto gain controller (AGC), for adjusting the strength of the signal.

A first LNA in the antenna module 110 primarily adjusts the strength of an RF signal received from outside the vehicle, based on the gain determined by a first AGC.

A second LNA in the radio tuner 130 secondarily adjusts the strength of an intermediate frequency (IF) signal into which the RF signal is converted, based on the gain determined by a second AGC.

The antenna module 110 and the radio tuner 130 are electrically connected through a connection cable 120. The connection cable 120 transmits signals between the antenna module 110 and the radio tuner 130.

However, a lot of external noise is introduced into the connection cable 120 between the antenna module 110 and the radio tuner 130. For example, a plurality of vehicle controllers disposed around the connection cable 120 may induce a noise signal, and noise may be introduced into the connection cable 120 from other wires around the connection cable 120.

Due to such external noise, it may be difficult for the second LNA in the radio tuner 130 to appropriately adjust the IF signal level. Here, the signal level refers to the strength or power of the signal. In other words, it may be difficult for the second AGC to appropriately adjust the gain of the second LNA. In this case, a passenger in the vehicle will hear noise when listening to a radio broadcast.

According to an embodiment of the present disclosure, the radio tuner 130 is able to prevent degradation of a noise factor in the antenna system, by adjusting the IF signal by taking into consideration the noise introduced into the connection cable 120.

Figure 2:
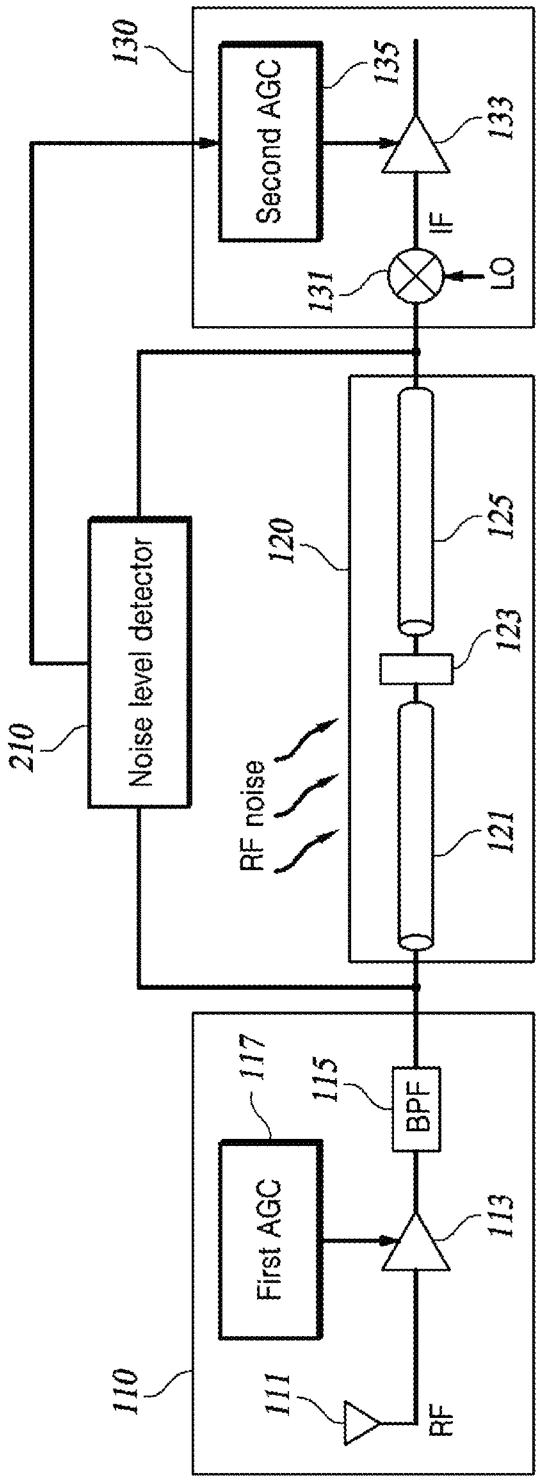
FIG. 2 is a configuration diagram of an antenna system according to an embodiment of the present disclosure.

FIG. 2 is a configuration diagram of an antenna system according to an embodiment of the present disclosure.

Referring to FIG. 2, the vehicle antenna system includes an antenna module 110, a connection cable 120, a radio tuner 130, and a noise level detector 210.

The antenna module 110 may include an antenna element 111, a first LNA 113, and a first AGC 117, and may further include a band pass filter (BPF) 115.

The antenna element 111 receives an RF signal. The antenna element 111 is implemented usually by using at least one type of antenna that can be installed on the vehicle. For example, the antenna element 111 may be implemented by employing a monopole antenna, a dipole antenna, a roof antenna, a slot antenna, etc.

The first AGC 117 determines the gain of the first LNA based on the strength of the RF signal. Here, the RF signal refers to the signal at the input of the first LNA 113.

The first LNA 113 adjusts the strength of the RF signal. The first LNA 113 may amplify the RF signal depending on the gain determined by the first AGC 117.

When the RF signal is a high electric field signal, i.e., the strength of the RF signal is higher than a first threshold, the first AGC 117 is powered on, and the gain of the first LNA 113 may be reduced. The gain of the first LNA 113 may be inversely proportional to the strength of the RF signal whose strength is higher than the first threshold. The first threshold may represent a reference for the high electric field signal at the antenna module 110.

On the other hand, when the RF signal is a low electric field signal, i.e., the strength of the RF signal is lower than the first threshold or a second threshold, the first AGC 117 is powered off, and the gain of the first LNA 113 is maintained constant. The second threshold is lower than the first threshold, and may represent a reference for the low electric field signal.

The band pass filter 115 is able to filter the frequency band of the RF signal adjusted by the first LNA 113, thereby reducing noise in the adjusted RF signal.

The RF signal adjusted by the antenna module 110 is sent to the radio tuner 130 through the connection cable 12.

Here, the connection cable 120 is a component that electrically connects the antenna module 110 and the radio tuner 130. The connection cable 120 may be composed of a single cable or a plurality of cables. For example, the connection cable 120 may include a first feeder cable 121, a second feeder cable 125, and a connector 123 connecting the two feeder cables. The feeder cables may be implemented by using pair cables, coaxial cables, optical fiber cables, Ethernet cables, etc.

The radio tuner 130 includes a second LNA 133 and a second AGC 135. The radio tuner 130 may further include a filter at the input of the second LNA 133 or at the input of a mixer 131, for extracting a target channel the user wants to listen to. In this case, an IF signal inputted into the second LNA 133 includes a signal from the target channel alone.

The mixer 131 down-converts the frequency of the adjusted RF signal, which is a high-frequency signal, into an IF signal. Specifically, a local oscillator (LO) generates a predetermined oscillation frequency source according to a control voltage and outputs it to the mixer 131. The mixer 131 may convert the adjusted RF signal into an IF signal based on the oscillation frequency source.

The second LNA 133 adjusts the strength of the IF signal. The second LNA 133 may amplify the IF signal depending on the gain determined by the second AGC 135.

The second AGC 135 determines the gain of the second LNA 133 based on the strength of the IF signal.

Here, the strength of the IF signal refers to the strength of an IF signal outputted from the second LNA 133, i.e., an amplified IF signal. In another embodiment, the strength of the IF signal may refer to the strength of an IF signal inputted into the second LNA 133. To this end, the radio tuner 130 may include a detector for detecting the signal level at the front or rear of the second LNA 133.

When the IF signal is a high electric field signal, i.e., the strength of the IF signal is higher than a third threshold, the second AGC 135 is powered off, and the gain of the second LNA 133 is maintained constant. The third threshold may represent a reference for the high electric field signal at the radio tuner 130.

On the other hand, when the IF signal is a low electric field signal, i.e., the strength of the IF signal is lower than the third threshold or a fourth threshold, the second AGC 135 is powered on, and the gain of the second LNA 133 may be increased. The gain of the second LNA 133 may be inversely proportional to an IF signal whose strength is lower than the third threshold or the fourth threshold. If the strength of the IF signal is lower than the third threshold or the fourth threshold, the gain of the second LNA 133 and the strength of the IF signal may be expressed in a linear shape with a negative slope. Meanwhile, the fourth threshold is lower than the threshold, and may represent a reference for the low electric field signal. The third threshold may be equal to or lower than the first threshold.

Meanwhile, the level of the adjusted RF signal and the strength of the IF signal may vary due to a noise signal introduced through the connection cable 120 between the antenna module 110 and the radio tuner 130. For example, an output RF signal from the connection cable 120 may be an input RF signal with noise. The strength of the output RF signal may be higher than the strength of the input RF signal due to the noise, and the strength of an IF signal inputted into the second LNA 133 may be distorted.

If the strength of the IF signal becomes closer to the third threshold due to noise, the second AGC 135 may reduce the gain of the second LNA 133. Alternatively, if the strength of an IF signal noise is lower than the third threshold, and sum of the strength of an IF signal and the noise level is higher than the third threshold, the second AGC 135 may be powered off due to noise. Consequently, even if a frequency filter for removing noise is applied to an output signal from the second LNA 133, the signal may have a low level and a poor signal quality.

Accordingly, in order to prevent distortion of a signal due to external noise introduced into the connection cable 120, the second AGC 135 determines the gain of the second LNA 133 by taking into consideration the noise level of the connection cable 120, as well as the strength of the IF signal.

To this end, the noise level detector 210 measures the noise level of the connection cable 120. For example, the noise level detector 210 may measure the noise level by comparing the power at the input of the connection cable 120 and the power at the output. For another example, the noise level detector 210 may measure the noise level based on a comparison between the frequency spectrum of a signal at the input of the connection cable 120 and the frequency spectrum of a signal at the output.

The second AGC 135 may determine the gain of the second LNA 133 based on the strength of a distorted IF signal inputted into the second LNA 133, and adjust the gain based on the noise level of the connection cable 120. The higher the noise level of the connection cable 120, the lower the gain determined by the second automatic gain controller 135 based on the strength of the distorted IF signal.

Alternatively, the second automatic gain controller 135 may determine the gain of the second LNA 133 based on the strength of the distorted IF signal and the noise level. For example, the second automatic gain controller 135 may save a gain graph for each segment of the noise level, and determine the gain according to the strength of the distorted IF signal by referring to the gain graphs corresponding to the segments of the measured noise level.

Alternatively, the second automatic gain controller 135 may adjust the slope of the inverse relationship between the gain of the second LNA 133 and the strength of the IF signal, based on the noise level. The higher the noise level of the connection cable 120, the lower the slope of the inverse relationship adjusted by the second automatic gain controller 135.

Afterwards, once amplified noise in the output IF signal from the second LNA 133 is removed, the output IF signal from which the amplified noise is removed becomes equal to an amplified IF signal that has no noise from the beginning.

Furthermore, the second AGC 135 may adjust the third and fourth thresholds of the second LNA 133 based on the noise level of the connection cable 120. The higher the noise level, the higher the third and fourth thresholds adjusted by the second automatic gain controller 135. It is possible to prevent the second AGC 135 from getting powered off due to noise in the distorted IF signal.

As such, the second AGC 135 may control the gain of the second LNA 133 by taking the noise level of the connection cable 120 into further consideration, thereby reducing distortion of the IF signal due to noise in the connection cable 120.

Figure 3:
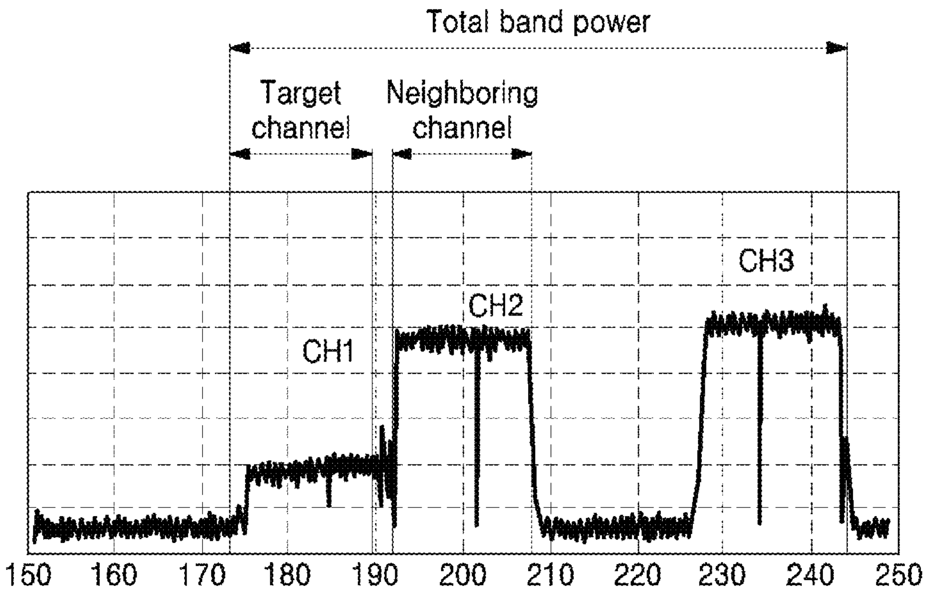
FIG. 3 is a view showing a frequency spectrum of an RF signal according to an embodiment of the present disclosure.

FIG. 3 is a view showing a frequency spectrum of an RF signal according to an embodiment of the present disclosure.

In a channel environment of a satellite broadcast that outputs a wide band frequency signal, signal strength varies widely depending on the region and weather in which the signal is received. Moreover, with the recent transition toward high-definition digital broadcasts, the specifications of receivers are getting stricter, which makes satellite broadcasters send stronger signals than they used to over the existing channels. For this reason, a target channel over which the user wants to receive signals and a channel neighboring the target channel are increasingly affecting each other.

Referring to FIG. 3, RF signals received by an antenna include signals from other channels, as well as signals from a target channel the user wants to listen to. Here, Channel 2, which is the neighboring channel, may have a much higher signal level than Channel 1, which is the target channel the user wants to listen to.

Referring further to FIG. 2, the first AGC 117 determines the gain of the first LNA based on the power of the entire frequency band in the RF signal. As shown in FIG. 3, if the signal level of the neighboring channel is high, the gain of the first LNA 113 may be determined depending on the signal level of the neighboring channel, rather than of the target channel. Specifically, if the signal level of the neighboring channel is higher than the first threshold, the first AGC 117 determines that the RF signal is a high electric field signal, and reduces the gain of the first LNA 113.

In this case, the total noise factor of the antenna system is deteriorated.

Specifically, in the antenna system, the noise factors of the antenna module 110, the connection cable 120, and the radio tuner 130 are calculated by dividing the signal-to-noise ratio (SNR) at the input by the SNR at the output.

The total noise factor of the antenna system is calculated based on the noise factor of cascaded components. The total noise factor can be calculated by Equation 1:

$$F_{total} = F_1 + \frac{F_2 - 1}{G_1} + \frac{F_3 - 1}{G_1 G_2} \quad \text{[Equation 1]}$$

wherein $F_{total}$ is total noise factor, $F_1$ is the noise factor of the antenna module 110, $F_2$ is the noise factor of the connection cable 120, $F_3$ is the noise factor of the radio tuner 130, $G_1$ is the gain of the antenna module 110, and $G_2$ is the gain of the connection cable 120.

Referring to Equation 1, as the gain $G_1$ of the first LNA 113 decreases, the total noise factor $F_{total}$ increases. That is, the total noise factor is worsened. In particular, since the antenna module 110 is positioned at the front end of the antenna system, the total noise factor may be further degraded.

Accordingly, the first AGC 117 needs to take into consideration the signal level of the target channel in the RF signal and the signal level of the neighboring channel, when determining the gain of the first LNA 113.

The antenna system according to an embodiment of the present disclosure determines the gain of the first LNA 113 by comparing the signal level of the target channel and the signal level of the neighboring channel.

Figure 4:
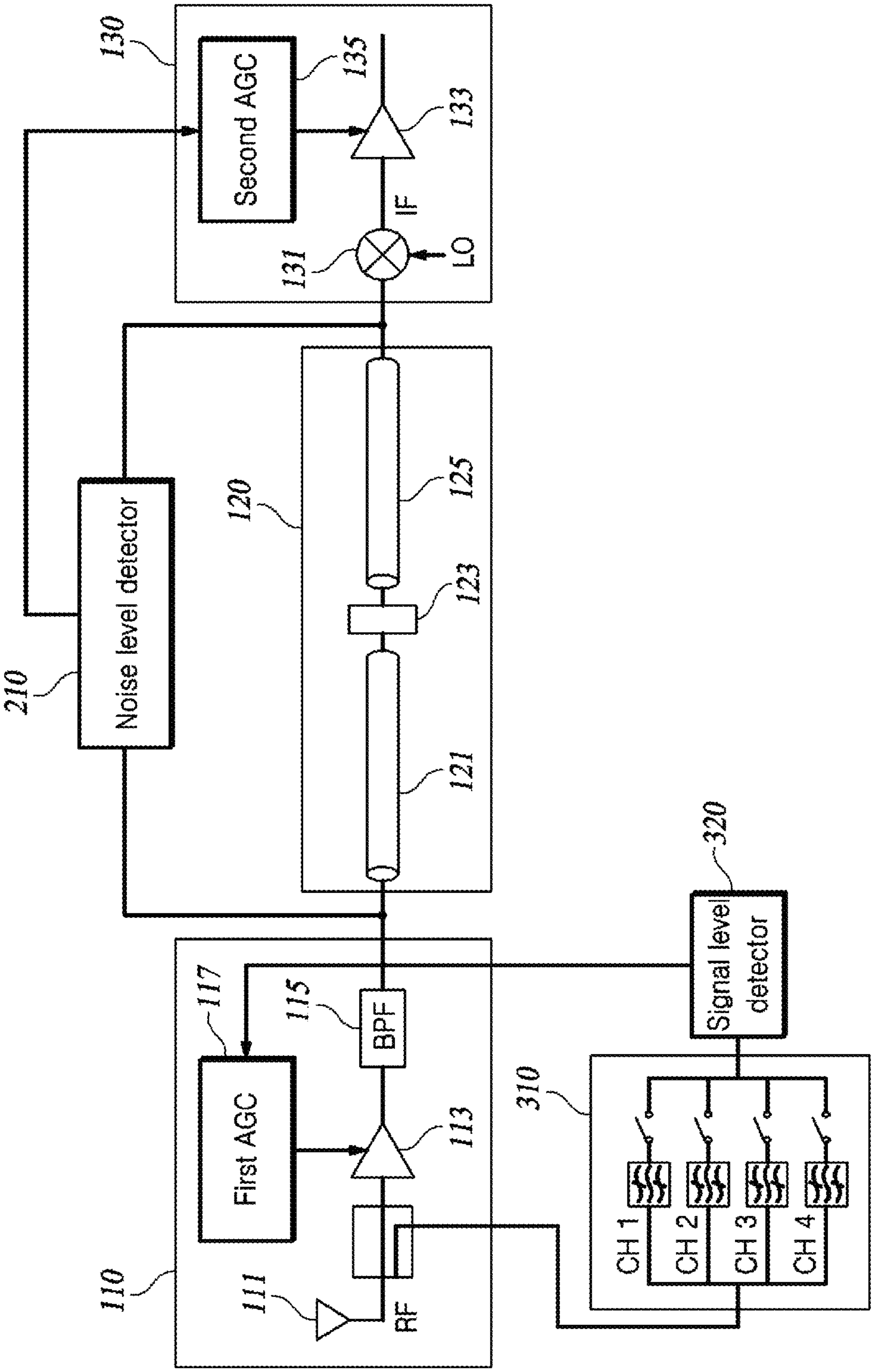
FIG. 4 is a configuration diagram of an antenna system according to an embodiment of the present disclosure.

FIG. 4 is a configuration diagram of an antenna system according to an embodiment of the present disclosure.

Referring to FIG. 4, the antenna system may further include a coupler 119, a filter 310, and a signal level detector 320. The coupler 119, the filter 310, and the signal level detector 320 may detect the signal level of each channel in an RF signal.

Specifically, the coupler 119 couples an RF signal received by the antenna element 111 and passes it to the filter 310.

The filter 310 is composed of a plurality of channel filters and switch elements, and is able to filter channel signals in some frequency bands of the RF signal.

The signal level detector 320 may sweep channels in the RF signal by controlling the switching of the switch elements in the filter 310. The signal level detector 320 may detect the signal level of each channel in the RF signal by sweeping the RF signal filtered through the channel filters. This allows the signal level detector 320 to detect the received signal strength indicator (RSSI) or power of each channel in the RF signal.

Meanwhile, in another embodiment, the signal level detector 320 may detect the signal level of each channel through analysis of the frequency spectrum of the RF signal obtained through the coupler 119, without using the filter 310.

Afterwards, the first AGC 117 determines the gain of the first LNA 113 based on the signal level of the target channel in the RF signal and the signal level of a neighboring channel.

In an embodiment, if the difference between the signal level of the target channel and the signal level of the neighboring channel is greater than a predetermined threshold, that is, the signal level of the neighboring channel is higher than the sum of the signal level of the target channel and a threshold, the first automatic gain controller 117 may increase or maintain the gain of the first LNA 113.

In another embodiment, if the signal level of the neighboring channel is higher than a first threshold, and the signal level of the target channel is lower than the first threshold, the first AGC 117 may increase or maintain the gain of the first LNA 113.

In another embodiment, if the signal level of the neighboring channel is higher than the first threshold, and the signal level of the target channel is lower than a second threshold, the first AGC 117 may increase or maintain the gain of the first LNA 113. Here, the second threshold is lower than the first threshold.

In another embodiment, if the signal level of the neighboring channel is higher than the first threshold, the signal level of the target channel is lower than the second threshold, and the signal level of the neighboring channel is higher than the sum of the signal level of the target channel and a threshold, the first AGC 117 may increase or maintain the gain of the first LNA 113.

When the signal from the target channel is identified as a low electric field signal, the second AGC 135 may maintain or increase the gain of the second LNA 133.

In another embodiment, the second AGC 135 may determine the gain of the second LNA 133 based on both the signal level of the target channel and the noise level of the connection cable 120.

As mentioned previously, when the neighboring channel is a high electric field and the target channel is a low electric field, the first AGC 117 may maintain or increase the gain of the first LNA 113, even though the RF signal is identified as a high electric field signal, thereby reducing degradation of the total noise factor of the antenna system.

Referring to Equation 1, since the effect of the radio tuner 130 on the total noise factor is determined based on the gain of the first LNA 113, the control from the AGC 117 may reduce the effect of the radio tuner 130 on the total noise factor.

Figure 5:
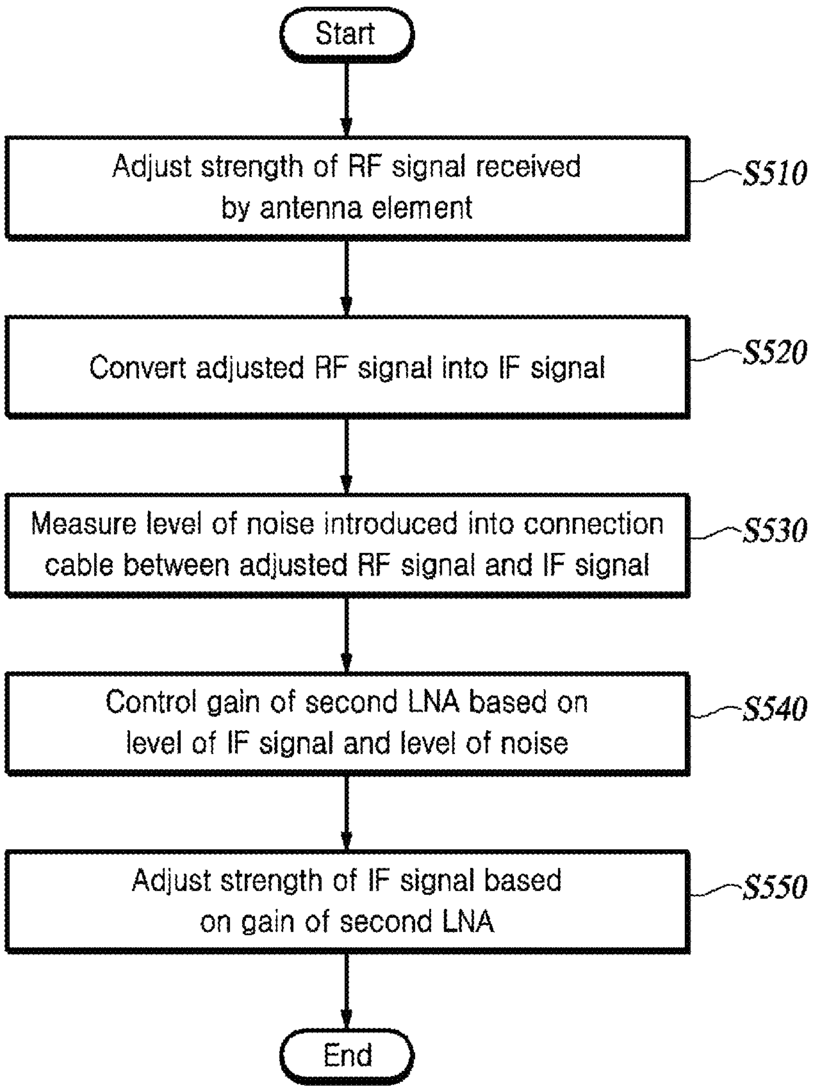
FIG. 5 is a sequence chart of an operation method of an antenna system according to an embodiment of the present disclosure.

FIG. 5 is a sequence chart of an operation method of an antenna system according to an embodiment of the present disclosure.

Referring to FIG. 5, a first LNA in the antenna system adjusts the strength of an RF signal received by an antenna element (S510).

Here, the antenna system includes a signal level detector and a first AGC, in order to determine the gain of the first LNA.

The signal level detector detects the signal level of each channel in the RF signal. The signal level detector may detect the signal level of each channel by sweeping the RF signal filtered through channel filters.

The first AGC controls the gain of the first LNA based on the signal level of the target channel in the RF signal and the signal level of a neighboring channel. Specifically, if the difference between the signal level of the target channel and the signal level of the neighboring channel is greater than a threshold, the first AGC may increase the gain of the first LNA.

A mixer in the antenna system converts the adjusted RF signal received through the connection cable into an IF signal (S520).

The noise level detector in the antenna system measures the noise level introduced into the connection cable between the adjusted RF signal and the IF signal (S530).

Specifically, the noise level detector measures the noise level introduced into the connection cable (S530).

A second AGC in the antenna system controls the gain of a second LNA based on the strength of the IF signal and the noise level (S540).

Specifically, the second AGC determines the gain of the second LNA based on the strength of the IF signal, and adjusts the gain of the second LNA based on the noise level.

Meanwhile, the second AGC is powered off based on a comparison between the strength of the IF signal and a threshold level. If the strength of the IF signal is higher than the threshold level, the second AGC is powered off. Here, the threshold level refers to the third threshold or fourth threshold in FIG. 2. The threshold level is determined based on the noise level. The threshold level may be lowered if the noise level is high. On the other hand, the threshold level may not be adjusted if the noise level is low.

The second LNA in the antenna system adjusts the strength of the IF signal based on the gain of the second LNA (S550).

The antenna system measures the noise level introduced into the connection cable between the first LNA of the antenna module and the second LNA of the radio tuner (S510).

The antenna system controls the gain of the second LNA according to the noise level (S520).

Furthermore, the antenna system may detect the signal level of each channel in the RF signal, and control the gain of the first LNA based on the signal level of the target channel in the RF signal and the signal level of a neighboring channel.

Specifically, the antenna system detects the signal level of each channel by sweeping the RF signal filtered through channel filters.

Afterwards, if the difference between the signal level of the target channel and the signal level of the neighboring channel is greater than a threshold, the antenna system may increase or maintain the gain of the first LNA.

As explained above, according to an embodiment of the present disclosure, it is possible to prevent degradation of a noise factor caused by noise introduced into a connection cable between an antenna module and a radio tuner.

According to another embodiment of the present disclosure, it is possible to prevent degradation of a noise factor caused by the signal strength of a channel neighboring a target channel.

The effects of the present disclosure are not limited to the above-mentioned ones, and other effects not mentioned herein may be clearly understood by those skilled in the art from the description below.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Rea Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. An antenna system of a vehicle, comprising:

a first low noise amplifier (LNA) for adjusting a strength of a radio frequency (RF) signal received by an antenna element;

a mixer for converting the adjusted RF signal received through a connection cable into an intermediate frequency (IF) signal;

a second low noise amplifier for adjusting a strength of the IF signal;

a noise level detector for measuring a noise level introduced into the connection cable; and a second auto gain controller (AGC) for controlling a gain of the second LNA based on the strength of the IF signal and the noise level:

wherein the second AGC is powered off based on a comparison between the strength of the IF signal and a threshold level; and wherein the threshold level is determined based on the noise level.

2. The antenna system of claim 1, wherein the second AGC determines the gain of the second LNA based on the strength of the IF signal, and adjusts the gain of the second LNA based on the noise level.

3. The antenna system of claim 1, further comprising:

a signal level detector for detecting a signal level of each channel in the RF signal; and a first AGC for controlling a gain of the first LNA based on a signal level of a target channel in the RF signal and a signal level of a neighboring channel.

4. The antenna system of claim 3, wherein, when the signal level of the neighboring channel is greater than a sum of the signal level of the target channel and a predetermined threshold, the first AGC increases the gain of the first LNA.

5. The antenna system of claim 4, wherein the signal level detector detects the signal level of each channel by sweeping the RF signal filtered through channel filters.

6. A vehicle comprising the antenna system of claim 1.

7. An operation method of a vehicle antenna system, the operation method comprising:

measuring, by a noise level detector, a noise level introduced into a connection cable between a first low noise amplifier (LNA) for adjusting a strength of an RF signal received by an antenna element and a second LNA for adjusting a strength of an IF signal into which the adjusted RF signal is converted; and controlling, by an auto gain controller, a gain of the second LNA based on the strength of the IF signal and the noise level;

wherein the controlling of the gain of the second LNA includes maintaining the gain of the second LNA based on a comparison between the strength of the IF signal and a threshold level; and wherein the threshold level is determined based on the noise level.

8. The operation method of claim 7, wherein the controlling of the gain of the second LNA includes:

determining the gain of the second LNA based on the strength of the IF signal; and adjusting the gain of the second LNA based on the noise level.

9. The operation method of claim 7, further comprising:

detecting a signal level of each channel in the RF signal; and controlling a gain of the first LNA based on a signal level of a target channel in the RF signal and a signal level of a neighboring channel.

10. The operation method of claim 9, wherein the controlling of the gain of the first LNA includes increasing the gain of the first LNA when the signal level of the neighboring channel is greater than a sum of the signal level of the target channel and a predetermined threshold.

11. The operation method of claim 10, wherein the detecting of the signal level of each channel includes detecting the signal level of each channel by sweeping the RF signal filtered through channel filters.

12. An operation method of a vehicle antenna system, the operation method comprising:

adjusting, by a first low noise amplifier (LNA), a strength of a radio frequency (RF) signal received by an antenna element;

converting, by a mixer, the adjusted RF signal received through a connection cable into an intermediate frequency (IF) signal;

adjusting, by a second low noise amplifier, a strength of the IF signal;

measuring, by a noise level detector, a noise level introduced into the connection cable; and controlling, by a second auto gain controller (AGC), a gain of the second LNA based on the strength of the IF signal and the noise level;

wherein the controlling of the gain of the second LNA includes maintaining the gain of the second LNA based on a comparison between the strength of the IF signal and a threshold level; and wherein the threshold level is determined based on the noise level.

* * * * *